United States Patent [19]
Biche

[11] Patent Number: 5,806,176
[45] Date of Patent: Sep. 15, 1998

[54] INSERTION TOOL AND METHOD OF USE

[75] Inventor: Barton A. Biche, Redwood City, Calif.

[73] Assignee: Raychem Corporation, Menlo Park, Calif.

[21] Appl. No.: 597,887

[22] Filed: Feb. 5, 1996

[51] Int. Cl.$^6$ ...................................................... B23P 19/00
[52] U.S. Cl. .............................. 29/747; 29/845; 29/876; 29/759
[58] Field of Search .......................... 29/881, 747, 748, 29/759, 845, 818, 761, 876

[56] References Cited

U.S. PATENT DOCUMENTS

| | | | |
|---|---|---|---|
| 3,667,102 | 6/1972 | Guillemette et al. ................... 29/747 |
| 3,676,912 | 7/1972 | Anhalt et al. . | |
| 3,802,049 | 4/1974 | Hennessey, Jr. . | |
| 4,967,470 | 11/1990 | Folk .................................... 29/759 X |
| 5,109,602 | 5/1992 | Fukuda et al. ......................... 29/845 |
| 5,355,583 | 10/1994 | Osumi et al. ........................ 29/759 X |
| 5,414,925 | 5/1995 | Nishide et al. ...................... 29/759 X |
| 5,515,601 | 5/1996 | Maejima ............................... 29/759 X |

Primary Examiner—Carl J. Arbes
Attorney, Agent, or Firm—Sheri M. Novack; Herbert G. Burkard

[57] ABSTRACT

An insertion tool for inserting substrates having contacts disposed at their distal ends into a connection device and a method of use. The tool of the present invention is useful with any size substrate and contact, but is particularly useful for wires or fiber optic cable having small diameters with insufficient rigidity to withstand the connection force required to insert the contact into the connection device. The tool includes a pusher arm which engages the contact and forces the contact into the connection device. As the contact is inserted, the pusher arm is also inserted into the connection device and is subsequently removed from the connection device.

11 Claims, 3 Drawing Sheets

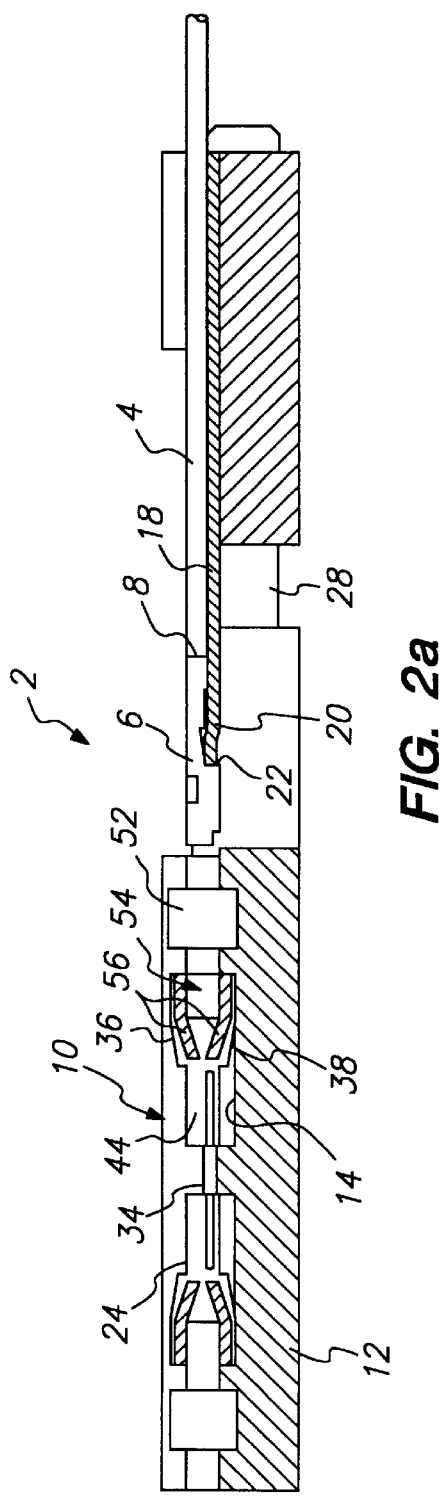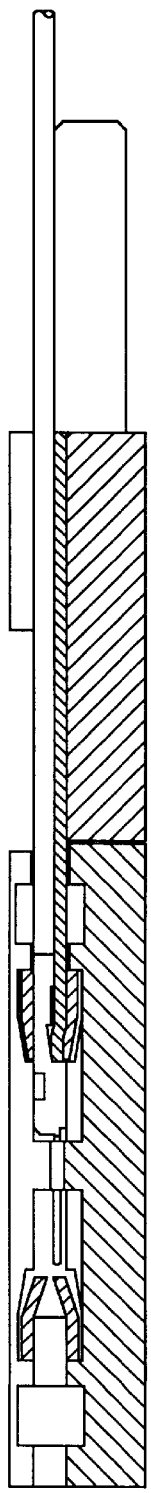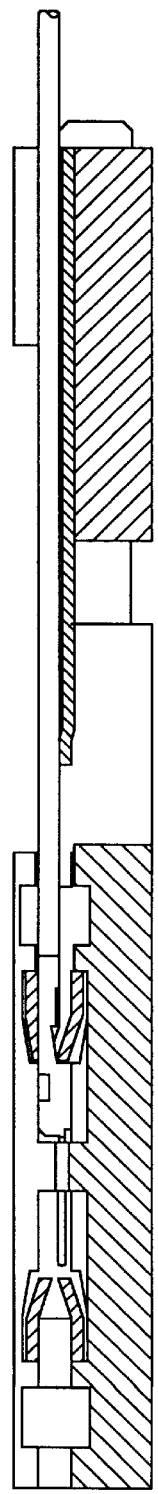

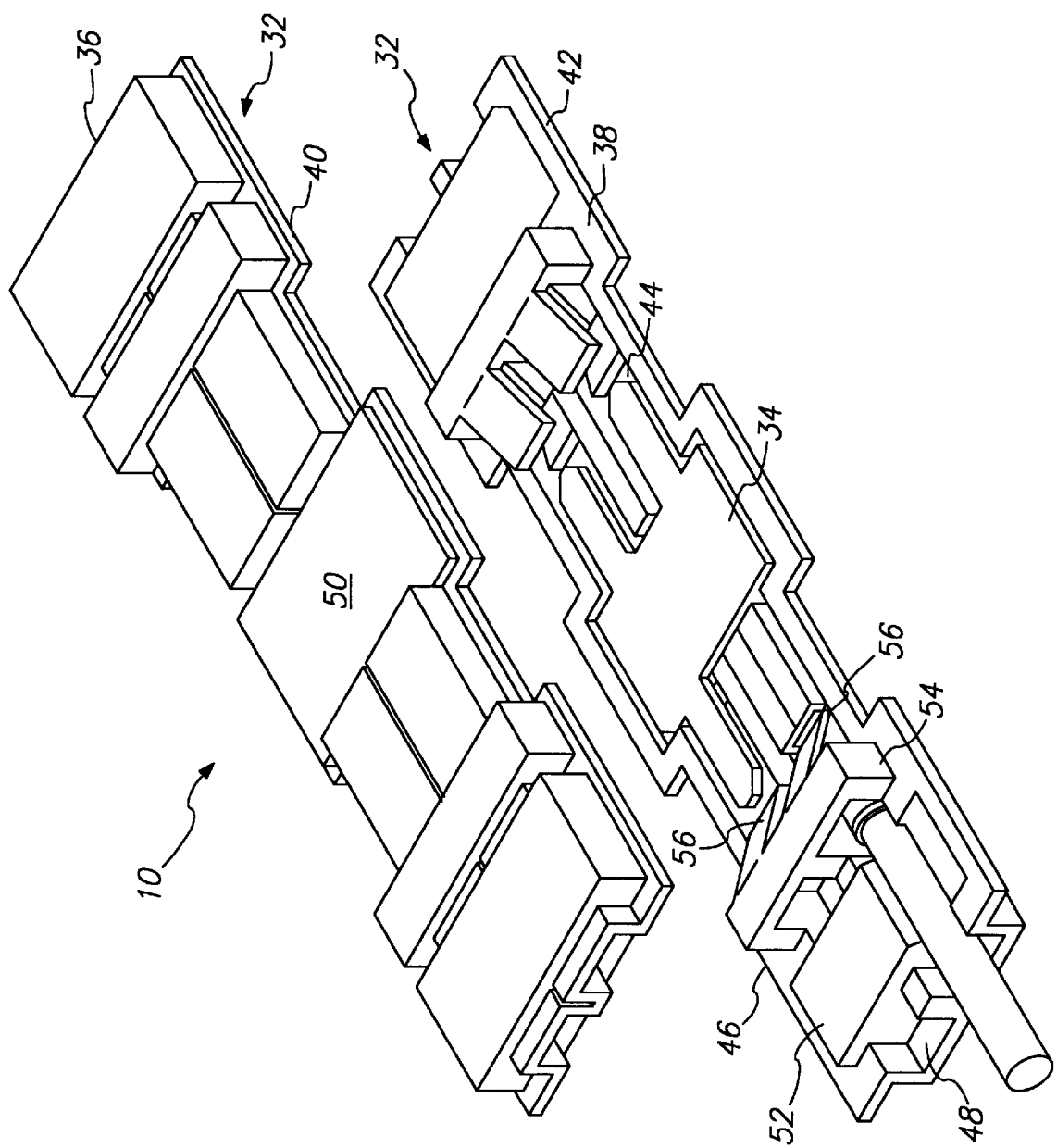

INSERTION TOOL AND METHOD OF USE

This invention relates to a tool for inserting a contact into a connection device and a method of using the tool. This tool is particularly useful for inserting a substrate having a contact into the connection device described in U.S. patent application Ser. No. 08/500,379 filed on Jul. 10, 1995 and entitled "Sealed Interconnection Device."

BACKGROUND OF THE INVENTION

Wire splicing in automotive electrical harnesses is typically done by crimping or welding wires to be spliced and then covering the joint to insulate and seal. Splicing operations are generally considered to be craft sensitive and, therefore, difficult to control. It is, however, desirable to provide consistent splicing and to ensure that the contact is fully connected to the electrical element and cannot be easily separated therefrom.

In a connection device as described in U.S. patent application Ser. No. 08/500,379 filed on Jul. 10, 1995 and entitled "Sealed Interconnection Device," the disclosure of which is incorporated by reference herein for all purposes, it may be difficult to properly insert the contact into the connection device because there is no efficient way to hold the substrate close enough to the contact so as to ensure that the contact is fully inserted into the connection device and connected to the electrical element. It is also desirable to provide consistent results. Many substrates, such as wires with small diameters, do not have sufficient rigidity to be capable of holding them the required distance from the contact and still be able to exert an insertion force for proper insertion into the connection device without buckling of the substrate.

SUMMARY OF THE INVENTION

I have designed an insertion tool for reliably inserting substrates having contacts disposed at the distal end of the substrates into a connection device and a method of use. The tool of the present invention avoids exerting an insertion force on the substrate, which might cause the substrate to buckle. Thus, this tool may be used with any size substrate and contact, but is particularly useful for wires or fiber optic cables having small diameters. The tool is designed to ensure that the contact is properly inserted into the connection device and placement of the contact is not sensitive to craftsmanship.

A first aspect of the invention comprises a method for connecting a substrate having a contact disposed at a distal end of the substrate to a connection device, the method comprising:
 a) locating the connection device in proper position and orientation within a cavity of a fixture base;
 b) locating the contact in proper position and orientation within a channel of the fixture base, the channel communicating with the cavity;
 c) engaging a proximal edge of the contact with a pusher arm; and
 d) sliding the pusher arm with respect to the fixture base so as to move the contact through the channel and thereby insert the contact into the connection device.

A second aspect of the invention comprises a tool for connecting a substrate having a contact disposed at a distal end of the substrate to a connection device, said tool comprising:
 a fixture base having a cavity for receiving the connection device in proper position and orientation within the cavity;
 a channel for guiding the substrate and contact for insertion into the connection device;
 a pusher arm for engaging a proximal edge of the contact; and
 means for sliding the pusher arm with respect to the fixture base so as to slide the contact through the channel and thereby insert the contact into the connection device.

A further aspect of the invention comprises a kit of parts containing:
 a) a connection device comprising:
  1) a body comprising:
   i) a first section and a second section bonded together to form an enclosure having an open edge;
   ii) a passageway extending from said open edge for receiving a substrate having a contact disposed at a distal end of the substrate; and
  2) an electrical element disposed in said enclosure at the end of said passageway opposite said open edge;
 b) a tool for connecting a substrate having a contact disposed at a distal end of the substrate to the connection device, the tool comprising:
  1) a fixture base having a cavity for receiving the connection device in proper position and orientation within the cavity;
  2) a channel for guiding the substrate and contact for insertion into the connection device;
  3) a pusher arm for engaging a proximal edge of the contact; and
  4) means for sliding the pusher arm with respect to the fixture base so as to slide the contact through the channel and thereby insert the contact into the connection device.

BRIEF DESCRIPTION OF THE DRAWINGS

FIGS. 2a, 2b and 2c are cross-sectional views of the insertion tool of the present invention illustrating a substrate having a contact in position for insertion into the connection device, in an intermediate step, and after insertion of the substrate and contact into the connection device.

FIG. 3 is an exploded view of the connection device.

DETAILED DESCRIPTION OF THE PREFERRED EMBODIMENTS

Figure 1:
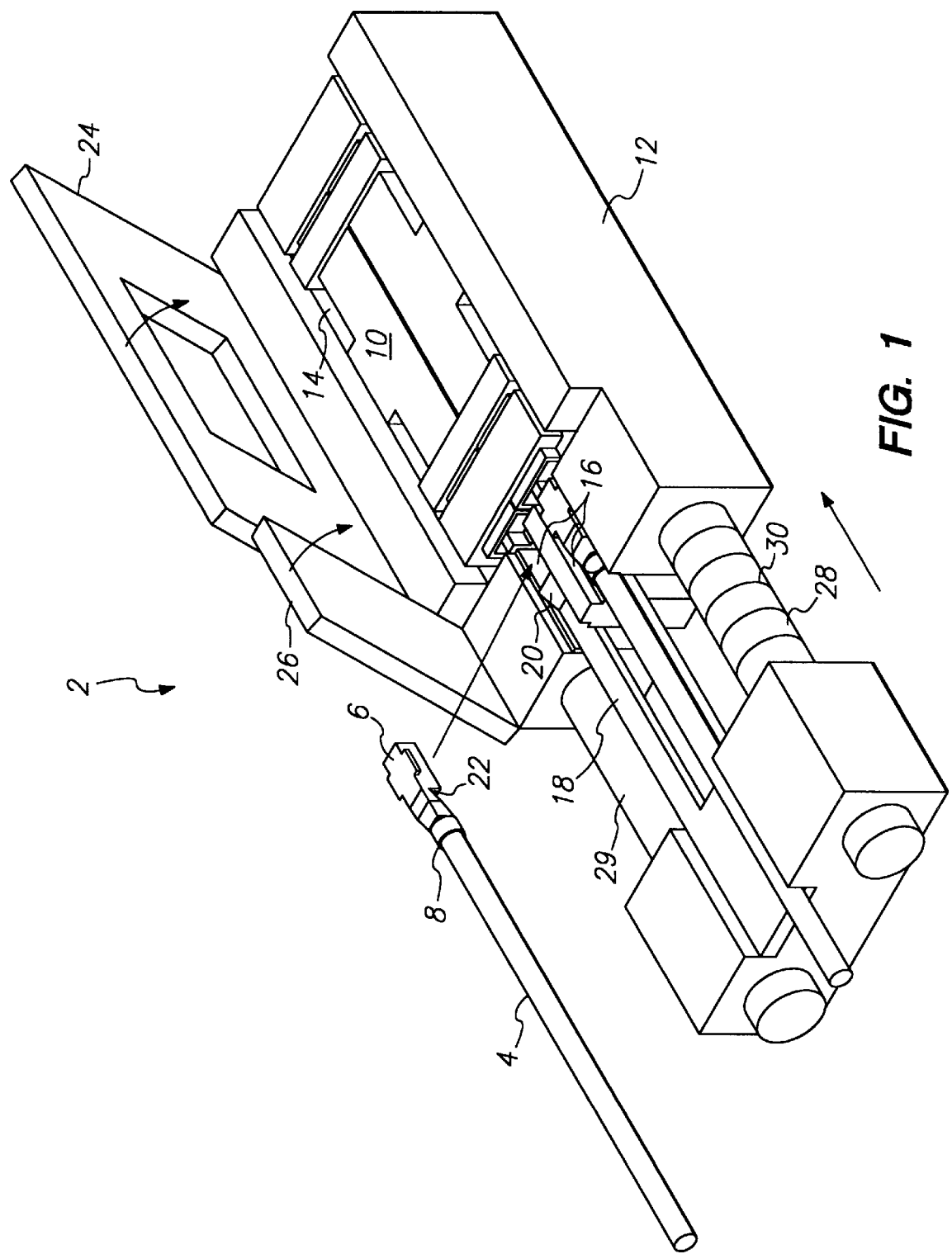
FIG. 1 is a perspective view of the insertion tool of the present invention.

Referring now to the drawings, FIGS. 1 and 2 illustrate an insertion tool 2 for connecting a substrate 4 having a contact 6 disposed at a distal end 8 of the substrate to a connection device 10. The body of insertion tool 2 is in the form of a fixture base 12.

Substrate 4 may be any elongate element which is to be inserted into a connection device. For example, the substrate may be a wire or optical fiber cable, particularly one having a small diameter which would normally buckle when subjected to an insertion force sufficient to insert the contact into the connection device.

Contact 6 is affixed to distal end 8 of substrate 4. One side of contact 6 protrudes radially outward from the longitudinal axis of the substrate, forming a proximal radial edge 22, as seen in FIGS. 1 and 2, the purpose of which is described below.

Fixture base 12 includes a cavity 14 for receiving connection device 10 in proper position and orientation. Cavity 14 is sized such that connection device 10 fits within the cavity, including depressions and protrusions (not shown) which conform to the shape of complementary protrusions and depressions of the connection device.

Fixture base 12 also includes a channel 16 communicating with cavity 14 for guiding substrate 4 and contact 6 into the connection device. Channel 16 is sized such that contact 6 fits therein in proper position and orientation. In a preferred embodiment, fixture base 12 includes a plurality of channels 16 for simultaneously inserting a plurality of substrates into a connection device.

A pusher arm 18 is employed to insert contact 6 into connection device 10. Pusher arm 18 is elongate and slides through channel 16 into cavity 14. The distal end of pusher arm 18 is raised slightly to form a lip 20, as shown in FIGS. 1 and 2, for engaging proximal radial edge 22 of contact 6 for exerting a force on the contact and inserting it into connection device 10. Pusher arm 18 extends into the proximal end of channel 16. The pusher arm is configured such that each channel 16 has a corresponding lip 20 for engaging the contact in that channel.

A connection device cover 24 retains connection device 10 in cavity 14 and establishes that connection device 10 is in its proper position and orientation. Connection device cover 24 is movable with respect to fixture base 12 and has a lock for retaining the connection device cover on the fixture base. Connection device cover 24 may be hinged to fixture base 12, as shown in FIG. 1, slidable on the fixture base, or removable from the fixture base. The lock may be a snap fit connection, or any other positive connection between the connection device cover and the fixture base. Because of the cooperation of the depressions and protrusions of the cavity and connection device, the connection device will properly fit into the cavity only if it is in proper position and orientation. Thus, the connection device cover is incapable of locking to the fixture base when the connection device is improperly received in the cavity.

A contact cover 26 retains contact 6 in channel 16 and establishes that the contact is in its proper position and orientation. Contact cover 26 is movable with respect to fixture base 12 and has a lock for retaining the contact cover on the fixture base. Contact cover 26 may be hinged to fixture base 12, as shown in FIG. 1, slidable on the fixture base, or removable from the fixture base. The lock may be a snap fit connection, or or any other positive connection between the contact cover and the fixture base. Because the contact is configured to protrude radially from one side of substrate 4 (as discussed above) and pusher arm includes a raised lip 20, proximal radial edge 22 fits into channel 16 with the proximal radial edge extending downwardly, distally of the pusher arm. If the contact is placed in the channel in any orientation other than with proximal radial edge 22 facing downwardly, the contact cover will not close properly. Contact cover 26 will close on fixture base 12 only when the contact is in proper position and orientation because the cover is incapable of locking to the fixture base when the connection device is improperly received in the cavity.

Connection device cover 24 and contact cover 26 may be separate elements, as shown in the drawings, or may be a single cover, securing both the connection device and contact.

Pusher arm 18 is designed such that it cannot begin to slide and advance into cavity 14 unless covers 24, 26 are closed and locked in place. Additionally, the pusher arm may be designed such that it cannot return to its initial position unless it has been fully advanced.

Alignment means acting with fixture base 12 and pusher arm 18 maintains alignment between the fixture base and pusher arm. The alignment means may have any acceptable configuration. In the most preferred embodiment, the alignment means is in the form of at least one axial rod 28, and more preferably two axial rods 28, 29, slidable relative to one of the pusher arm and fixture base so that as the pusher arm is moved through channel 16 and into cavity 14. The axial rod or rods ensure that the force of the pusher arm is directed so as to insert the contact into the connection device. As shown in FIG. 1, the axial rod is attached to fixture base 12, however, it is within the scope of the present invention to construct insertion tool 2 with an axial rod connected to the pusher arm and slidable into the fixture base.

Biasing means 30 biases the pusher arm in the proximal direction through channel 16 and out of cavity 14. In the preferred embodiment, the biasing means comprises a spring, more preferably a coil spring, positioned between the fixture base and the pusher arm. It should be noted that any type of biasing means which would urge the fixture base and pusher arm apart may be employed, for example, air or hydraulic pressure.

A contact test circuit may be included on insertion tool 2 to test the circuit and ensure that the substrate to be inserted into connection device 10 is the desired substrate.

Connection device 10 may be a sealed interconnection device as described in U.S. patent application Ser. No. 08/500,379 entitled "Sealed Interconnection Device" and referred to above, but the connection device need not be a sealed device. Connection device 10 is shown in detail in FIG. 3. Connection device 10 includes a body 32 and an electrical element 34. Body 32 comprises a first section 36 and a second section 38 bonded together along edges 40, 42 to form an enclosure 44 having an open edge 46. Enclosure 44 includes passageways 48 extending from open edge 46 for receiving substrate 4, to a retaining portion 50 of the enclosure. Electrical element 34 is retained within enclosure 44 in retaining portion 50. A sealing member 52 may be located in enclosure 44 adjacent open edge 46, at the opposite end of passageways 48 from the electrical element. It should be noted that the connection device used in conjunction with the present invention need not be sealed.

Sections 36, 38 are preferably constructed of multiple layers of polymeric film, more preferably expanded film bonded together to form enclosure 44. It should be noted, however, that sections 36, 38 may be a variety of constructions, for example, formed, molded or extruded parts. Prior to securing sections 36, 38 together, electrical element 34 and sealing member 52, if present, are inserted into enclosure 44 so as to be enclosed therein when the sections are secured together. In the preferred embodiment, sections 36, 38 are mirror images of each other, together forming enclosure 44, including passageways 48 and retaining section 50.

Unless restrained by passageways 48, open edge 46 preferably has a configuration such that at least one dimension is smaller than a corresponding dimension of electrical element 34. In this way, the electrical element is retained within enclosure 44. In the preferred embodiment, connection device 10 has more than one open edge through which substrates may be inserted for connection to the electrical element as seen in FIGS. 2 and 3; however, only one edge may be open for receiving substrates.

Electrical element 34 may be any electrical joining device, such as a splice, a ground, a circuit protection device, a printed circuit device, or any of a number of electrical elements for which it is desirable to connect substrates thereto. Electrical element 34 is placed in retaining portion 50 prior to securing sections 36, 38 together, as discussed above. The configuration of electrical element 34, enclosure 44 and retaining portion 50 are such that once sections 36, 38 are secured together, the electrical element cannot be removed from the enclosure.

Electrical element 34 is preferably relatively flat when connection device 10 has only a first and second section; however, body 32 may be constructed of more than two sections, such that the electrical element may have a more three dimensional configuration. Additionally, multiple electrical elements may be included in enclosure 44. Multiple electrical elements may or may not be isolated from every other electrical element.

A locking means may be employed for locking substrates into connection device 10. Locking means is preferably a locking element 54 captivated between passageways 48 and electrical element 34 such that when contact 6 is inserted therethrough, the contact cannot be easily removed. In the preferred embodiment, as the contact slides into locking element 54, the element is constructed such that portions 56 of the locking element are forced apart and, once the contact is fully inserted, portions 56 of the locking element return to their original configuration preventing proximal radial edge 22 from returning through locking element portions 56, resulting in a detent action which portions 56 are described herein as element portions 56 are described herein as being a separate mechanical element, however, the locking element portions could be formed as part of body sections 36, 38. Additionally, any locking means may be employed in the present invention, including heat deformation of a portion the body.

In use, connection device 10 is inserted and located in cavity 14 of insertion tool 2 in proper position and orientation, as described above. Connection device cover 24 is closed to ensure that connection device 10 is retained in proper position and orientation. One or more contacts 6 is inserted into channels 16 in proper position and orientation, with proximal radial edge 20 extending downwardly, distally of pusher arm 18. No more than one contact is inserted into each channel. Contact cover 26 is closed to ensure that contact 6 is retained in proper position and orientation.

A lip 20 of pusher arm 18 engages each contact 6. Insertion tool 2 may be a manual hand tool which may include a handle, or may be automated, for example, with air, hydraulic or electric activation. Actuation of insertion tool 2 slides pusher arm 18, forcing contact 6 in a distal direction into connection device 10. As it slides, contact 6 enters into locking element 54 and is locked in place. Pusher arm 18 enters the connection device with contact 6 and, if sealing member 52 is present, through the member. Biasing means 30 biases pusher arm 18 in the proximal direction out of the connection device and cavity, through channel 16 and is thereby removed from the connection device.

The present invention thus connects substrates to the connection device by exerting a force on the contact rather than the substrate, thus the strength and rigidity of the substrate is not a factor in connecting the contact to the connection device.

Variations and modifications can be made to the present invention without departing from the scope of the present invention, which is limited only by the following claims.

I claim:

1. A tool for connecting a substrate having a contact disposed at a distal end of the substrate to a connection device, said tool comprising:

a fixture base including:
      a cavity for receiving the connection device in proper position and orientation within the cavity;
      at least one channel in communication with the cavity, for guiding at least one substrate and contact for insertion into the cavity and into a connection device in position within the cavity;
   a pusher arm for engaging a proximal edge of the contact, wherein the pusher arm is aligned with the channel in a manner so that the longitudinal centerline of the pusher is centered with or parallel to the longitudinal centerline of the channel; and
   a device which operates in cooperation with the pusher arm to enable the pusher arm to slide with respect to the fixture base so as to push the contact disposed at the distal end of the substrate through the channel and to insert the contact into the connection device.

2. The tool as defined in claim 1, further comprising means for establishing that the connection device is in proper position and orientation in the cavity.

3. The tool as defined in claim 2 wherein the means for establishing comprises a connection device cover movable with respect to the fixture base and having a lock for locking the connection device cover to the fixture base, the connection device cover being incapable of locking to the fixture base when the connection device is improperly received in the cavity.

4. The tool as defined in claim 1, further comprising means for establishing that the contact is in proper position and orientation in the channel.

5. The tool as defined in claim 4 wherein the means for establishing comprises a contact cover movable with respect to the fixture base and having a lock for locking the contact cover to fixture base, said contact cover being incapable of locking to the fixture base when the contact is improperly received in the channel.

6. The tool as defined in claim 1 comprising a plurality of channels for guiding a plurality of contacts for insertion into the connection device.

7. The tool as defined in claim 1, further comprising alignment means for maintaining alignment between the pusher arm and the fixture base.

8. The tool as defined in claim 7 wherein the alignment means comprises an axial rod slidable relative to either the pusher arm or the fixture base.

9. The tool as defined in claim 8, further comprising a spring for biasing the pusher arm in a proximal direction through the channel and out of the cavity.

10. The tool as defined in claim 1, further comprising biasing means for biasing the pusher arm in a proximal direction through the channel and out of the cavity.

11. The tool as defined in claim 2, wherein the means for establishing that the connection device is in proper position and orientation in the cavity is a cooperative combination between the cavity and the connection device of at least one depression and at least one protrusion.

\* \* \* \* \*